May 6, 1969

J. W. BOZEK 3,442,391

FILTER ELEMENT

Filed Feb. 13, 1967

INVENTOR.
JOHN W. BOZEK
BY
*James L. O'Brien*
ATTORNEY

United States Patent Office 3,442,391
Patented May 6, 1969

3,442,391
FILTER ELEMENT
John W. Bozek, Waterford, Mich., assignor to The
Bendix Corporation, a corporation of Delaware
Filed Feb. 13, 1967, Ser. No. 616,150
Int. Cl. B01d 29/20, 39/16
U.S. Cl. 210—457                  8 Claims

ABSTRACT OF THE DISCLOSURE

A tubular filter element, for liquids such as fuel, formed of a plastic bonded fibrous material having a two-ply core in which the inner ply is perforated.

BACKGROUND OF THE INVENTION

This invention relates to a filter element in the form of a hollow tube which is closed at one end and open at the other end into which fuel can be introduced and forced radially outwardly through the walls of the element for the removal of particles in the fuel and for the coalescence of emulsified water in the fuel. One of the problems encountered in the use of prior art filter elements of this type is the tendency of the particles, such as dirt, in the fuel to compact or agglomerate on the inner cylindrical surface of the tube. This results in an increase in the resistance of the element to the passage of fluid therethrough, thereby reducing the useful life of the filter. Various efforts have been made to overcome these undesirable results and increase the dirt capacity of the tubular filter element. It is known that by increasing the area of the inner cylindrical surface of the tube, the capacity of the tube for holding particles will be increased, as illustrated in U.S. Patent No. 3,186,551. This surface area can be increased by forming the tube from fiber materials bonded with a resinous binder and molding grooves or convolutions into the inner surface of the tube. However, by following this approach, the increase in dirt capacity will be less than the increase in surface area because the molding process changes the surface condition. In the depressed regions of the inner surface, the fibers are pressed closer to each other and the spaces between the fibers are more completely filled with the hardened resinous binder. The higher density and the glazed surface in these regions reduces the dirt capacity of the element.

Another technique is to cut or machine the grooves into the inner cylindrical surface after the element has been formed and heat-cured. The machining process results in a certain amount of loose, small particles of fibers from the filter element being trapped in loose form in the element. When fuel is passed through the element, these trapped particles reduce the effectiveness of the element and shorten its life. Furthermore, the spacing and depth of the machined grooves is limited by the fragile, fibrous nature of the element. A groove construction and arrangement which gives the greatest increase in surface area results in the formation of high, narrow projections between the grooves, and these projections are readily broken off.

It is an object of this invention, therefore, to provide an improved filter element having a high dirt retaining capacity and which is not subject to the foregoing objections and limitations.

SUMMARY OF THE INVENTION

It has been discovered that the desired filtering properties can be achieved if the inner surface of the fiber element is shaped or formed prior to bonding the fiber material together and when it is in a wet state impregnated with uncured plastic resin. The bonding operation can then be carried out by proper heat treatment of the element so as to bond the fibrous material together into a rigid but porous body.

Thus, in one form of the present invention a fuel filter element is provided having an annular two-ply core of relatively low density fibrous structure for providing a depth filter to effect distribution of filtered particles through the entire wall thickness of the core. The core is fabricated in two separate layers, the inner layer being formed from a fiber glass mat which is perforated while the mat is in a wet condition after being impregnated with uncured thermosetting plastic resin. The outer layer is formed from imperforate fiber glass mat which is also impregnated with uncured thermosetting plastic resin. The core is placed over a rigid form and subjected to heat treatment which cures the resin and bonds the glass fibers into a rigid structure. The heat treated core is then used as a form for the forming of an outer shell which contacts and encircles the core. The shell is also formed from fiber glass mat impregnated with an uncured thermosetting resin. The fiber glass mat used in forming the shell is compacted more densely than the mat which is used for making the core so that the pores in the shell are of a reduced size relative to those in the core. This has the effect of rigidifying the shell and of bonding the inner surface of the shell to the outer surface of the core. The filter element is completed by placing suitable caps on the opposite ends of the tube formed by the core and shell.

In a filter element formed according to this invention, the fiber glass material at the radially outer ends of the perforations is not only not compacted, but is actually less dense than the surrounding material. This condition exists because the fiber glass in the outer ply of the core which backs up the holes in the inner ply is free to expand down into the holes. This expansion effect makes the holes in the inner ply barely noticeable prior to the time that the finished filter element is put into use. After the element has been used and becomes partially loaded with dirt and other particles, the holes become quite prominent. The dirt collects in the holes and the resulting increased differential pressure recompresses the fiber glass at the radially outer ends of the holes.

Other objects and features of this invention will appear in the following description and appended claims, reference being had to the accompanying drawing forming a part of this specification wherein like reference characters designate corresponding parts in the several views.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
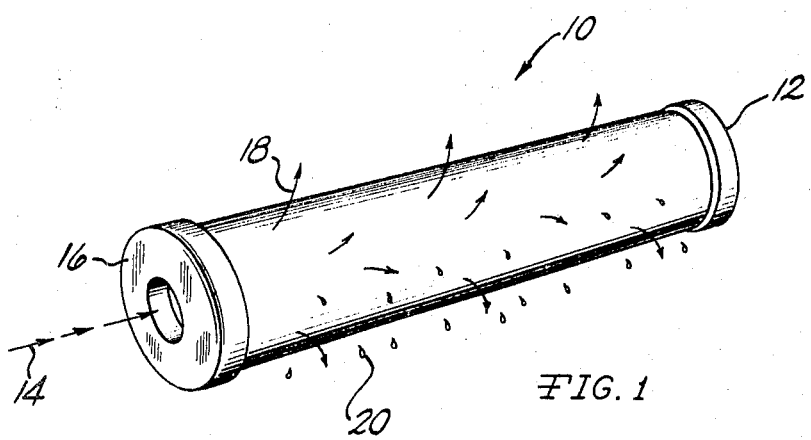
FIGURE 1 is a perspective view of a filter element embodying the present invention.
Figure 2:
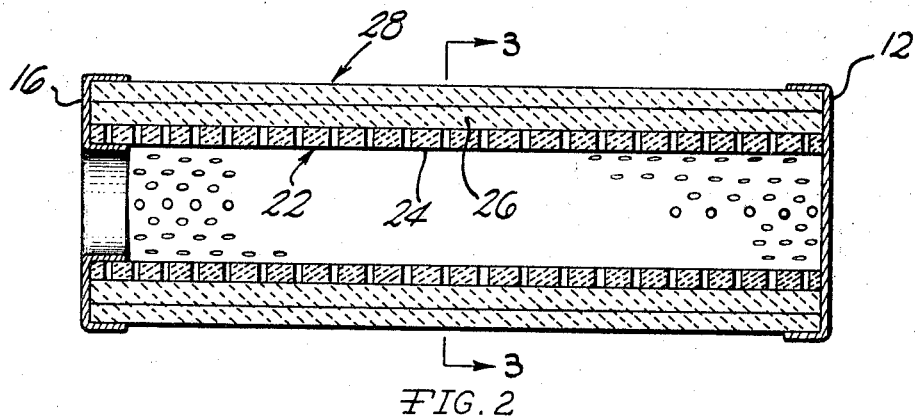
FIGURE 2 is an enlarged longitudinal section taken on the lines 2—2 of FIGURE 3 of the filter element illustrated in FIGURE 1.
Figure 3:
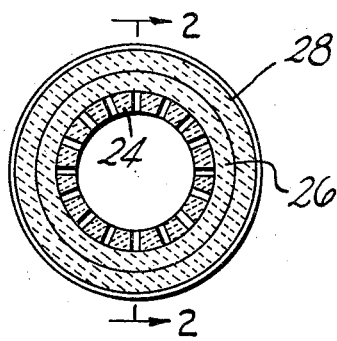
FIGURE 3 is a transverse section taken on the lines 3—3 of FIGURE 2.

Referring now to the drawing, the invention will be described in greater detail. As shown in FIGURE 1, the fuel filter element 10 is in the form of a hollow tube which is closed at the one end by the cap 12 and is open at the other end for the inflow of fuel, as indicated by the arrows 14, through the annular cap 16. The fuel normally will be introduced into the filter element 10 under pressure so that it will be forced radially outwardly through the walls of the filter element 10 to be discharged from the outer surfaces thereof as indicated by the plurality of arrows 18. Particles in the fuel will be separated therefrom and will be captured within the filter element 10 while emulsified water in the fuel will be coalesced and separated and the water and purified fuel will emerge from the outer surface in the form of the drops 20.

The core 22 consists of two separate layers or plies 24 and 26 which provide a low density uncompacted fibrous structure which acts as a depth filter and permits the distribution of particles through the entire wall thickness of the core. The inner layer 24 is formed from uncured fiber glass mat which is perforated before the core is heat treated to rigidify it to its final form. The outer layer 26 is formed of the same fibrous material as the inner core 24, but the outer layer 26 is left in an imperforated state. The core is then placed over a rigid form and subjected to a heat treatment which cures the resin and bonds the fiber glass into a rigid structure. The heat treated core is then used as a form for the forming of the shell 28 which comprises a single layer of fiber glass mat impregnated with an uncured thermosetting resin. This mat is compacted more tightly on the core 22 so as to densify the fiber glass mat after which it is heat treated so that the shell is rigidified. This latter step also assures that the shell will be bonded directly to the outer surface of the core 22.

After the core and shell have been formed in the manner described, the caps 12 and 16 can be inserted in place. The shell also can be covered with other media for performing specific functions such as may be desired. A barrier layer may be added to prevent passage of ultra-fine particles, and a reinforcing layer may be added to increase the radial strength. Also, a droplet growth layer may be added to promote the formation of large, free falling water drops. These layers will not be described in detail because they are known in the art and do not form a part of the present invention.

The primary function of the core is the removal and retention of solid particles in the fuel. This is accomplished in a most satisfactory manner because of the low density of the fibrous structure which acts as a depth filter and permits the distribution of particles throughout the entire wall thickness of the core so as to provide maximum and uniform life of the filter element. The shell performs several functions. It serves as a backup barrier for particles which might pass through the core and it coalesces emulsified water in the fuel, and it provides the element with the required radial strength.

From the foregoing description it will be understood that a novel and unique filter element has been provided in an unobvious manner, which has superior filtering characteristics when compared with prior art structures. By virtue of the construction of the inner layer of the core, a discontinuous surface of optimum structure is provided to reduce materially the problem of agglomeration and compacting of particles on the inner surface of the core, and at the same time to provide relatively large surface areas for the unfiltered fuel to enter the element. The desired depth of filtering is realized, and of significant importance is the absence of loose particles within the core that has been an inherent fault of some of the prior art devices.

I claim:
1. A filter and water separator element comprising an annular core of relatively low density fibrous structure for providing a depth filter to effect distribution of filtered particles through the entire wall thickness of the core, said core having inner and outer layers of plastic resin bonded fibers, the inner layer having a plurality of radially directed holes therethrough, and an annular shell of relatively higher density fibrous structure surrounding said core and in contact therewith for capturing particles that may pass through said core and for coalescing emulsified water in liquid passed through said core, said shell being a layer of plastic resin bonded fibers.

2. A filter and water separator element according to claim 1 further including a closed end cap positioned on one end of said shell and core and closing the one end of said core, and an open end cap positioned on the other end of said shell and core and having a central opening for inflow of liquid to be filtered.

3. A filter element according to claim 1 wherein said radially directed holes are uniformly arranged axially and circumferentially throughout said inner layer to provide a discontinuous surface which minimizes the agglomeration or compacting of particles on the inside diameter of the core.

4. A filter element according to claim 1 wherein the inner surface of said shell is bonded to the outer surface of said outer layer.

5. A filter element in the form of a hollow tube which is closed at one end and open at the other end into which fuel can be introduced and forced radially outwardly through the walls of the element, said element comprising an annular core of relatively low density fibrous structure for providing a depth filter to effect distribution of filtered particles through the entire wall thickness of the core, said core having inner and outer layers of plastic resin bonded fibers, the inner layer having a plurality of radially directed holes therethrough formed by perforating the fiber layer prior to curing the plastic resin, an annular shell of relatively higher density fibrous structure surrounding said core and in contact therewith, said shell being a layer of plastic resin bonded fibers compacted more densely than the fibers of said core, a cap fitted over one end of said shell and closing the opening in the core, and an annular cap fitted over the other end of said shell and core.

6. A filter element according to claim 6, wherein the fibers in said core are fiber glass.

7. A filter element according to claim 6, wherein the fibers in said shell are fiber glass.

8. A filter element according to claim 6, wherein the fibers in said shell and said core are fiber glass.

References Cited
UNITED STATES PATENTS

| | | | |
|---|---|---|---|
| 3,186,552 | 6/1965 | Cutler | 210—457 |
| 3,210,229 | 10/1965 | Feine. | |
| 3,347,391 | 10/1967 | Steensen | 210—491 |

SAMIH N. ZAHARNA, *Primary Examiner.*

J. ADEE, *Assistant Examiner.*

U.S. Cl. X.R.

210—491, 497